Feb. 2, 1965    B. G. E. STIFF    3,168,208
SEALING CLOSURE INCORPORATING LINEAR MOTION STRAIN WAVE DRIVE
Filed April 13, 1962    2 Sheets-Sheet 1
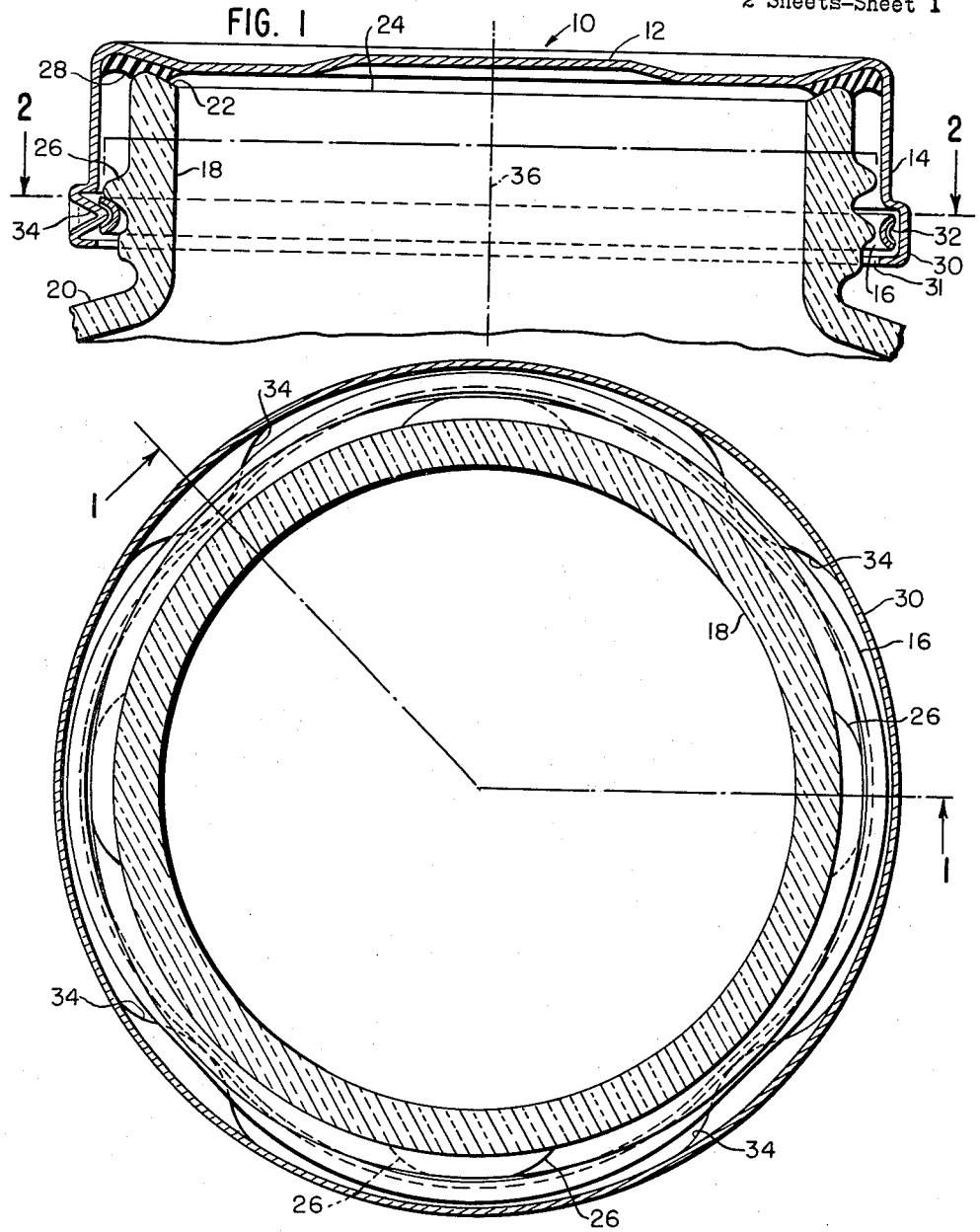
INVENTOR.
BERNARD G. E. STIFF Feb. 2, 1965 B. G. E. STIFF 3,168,208
SEALING CLOSURE INCORPORATING LINEAR MOTION STRAIN WAVE DRIVE
Filed April 13, 1962 2 Sheets-Sheet 2
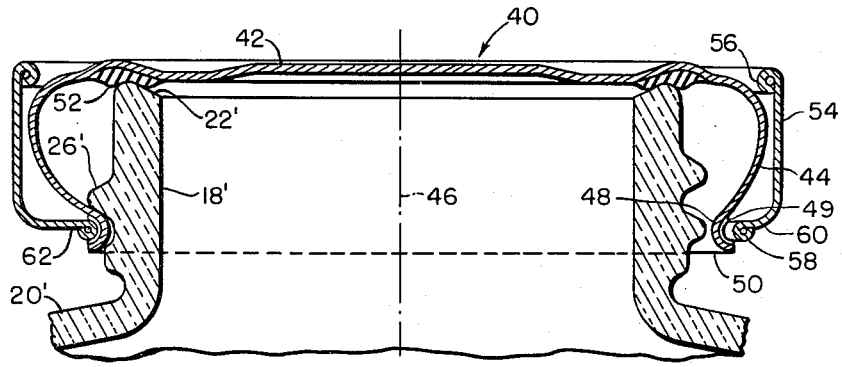
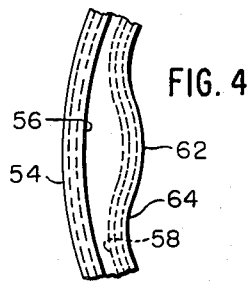
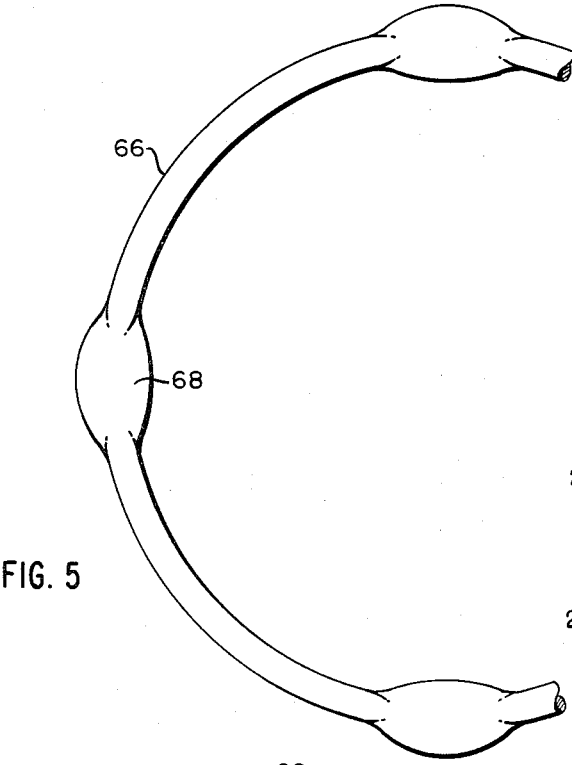
INVENTOR.
BERNARD G. E. STIFF
BY Kenway, Jenney & Hildreth

United States Patent Office 3,168,208
Patented Feb. 2, 1965

3,168,208
SEALING CLOSURE INCORPORATING LINEAR MOTION STRAIN WAVE DRIVE
Bernard G. E. Stiff, 1350 Main St., Lynnfield Center, Mass., assignor of twenty-five percent to William L. Ericson, Marblehead, Mass.
Filed Apr. 13, 1962, Ser. No. 187,334
8 Claims. (Cl. 215—40)

This invention relates to an improved sealing closure for an opening in a container, of the kind which is formed with a grooved annular portion, such as a helical thread or a series of spaced circular grooves, extending about the opening therein.

Actuation of conventional screw tops for jars or containers of this type entails sliding friction between a compressible sealing gasket and the wall, and also between the threads of the top and the mating threads of the container, and some difficulty is frequently experienced in manually removing such a top once it has been securely attached. In containers of glass or metal having metal tops, the relatively high coefficient of friction between the container and its top is largely responsible for this difficulty. The torque necessary to overcome the sliding friction of a tightly-engaged screw top is further magnified when a deformable gasket ring is provided to sealingly engage the container top for forming a liquid- and gas-tight seal, as is usually the case in containers for storing foods, medicines, volatile liquids, and the like, to protect the contents from contamination and leakage. The distortion of a gasket ring necessary to secure an effective seal establishes a substantial force along the polar axis of the threads, which further increases the frictional reaction to rotation of the top, and many consumers are therefore often unable to initiate removal of such tops without using tools. While in some conventional jars, a closure disc may be formed as an element separate from the screw top, and thus avoid rotation with respect to the jar of an attached gasket, the sliding friction with the top itself is not reduced, and the separability of the parts is an inconvenience.

It is the primary object of my invention to provide a sealing closure for container openings of the kind described, which makes it feasible to materially reduce the torque required to actuate the closure to and from sealing engagement with the container opening, although the container, the closure, and a sealing gasket may be formed of materials having relatively high coefficients of friction, such as glass, rubber, and metal. It is another object of my invention to reduce the manual effort involved in sealing and unsealing a closure with a container opening. It is another object to provide an improved closure which substitutes rolling for sliding frictional engagement between the closure and cooperating grooves or threads of a container. It is another object to provide an improved sealing closure in which a closure disc and a sealing gasket may be affixed to a closure element for engaging grooves or threads of a continer, and yet not entail rotational sliding friction between the gasket and the container as they are compressed together to seal an opening. It is still another object of my invention to provide an improved, easily removable sealing closure which features an uncomplicated design and can be inexpensively manufactured, and which is adaptable to conventional containers without requiring any modification thereof.

Briefly stated, according to a preferred embodiment thereof, I may carry out my invention by providing a closure including a deformable member and a strain wave generator member, which are operable as elements of a linear motion strain wave drive mechanism in cooperation with a grooved portion of a container; and further including closure means drivingly engaged with one of the foregoing members for actuation thereby to sealingly engage an opening of the container.

The deformable member and strain wave generator member have mutually-engaging working surfaces which are preferably formed of, or coated with, materials having relatively low coefficients of friction with respect to one another, such as certain plastics. Although these members are in sliding frictional engagement, it is thus possible to materially reduce the frictional reaction to actuation of the closure without departing from conventional relatively high friction but desirable materials in the container itself, such as glass or metal. This result is possible because the closure is in rolling, rather than sliding, frictional engagement with the container itself.

In preferred embodiments, a sealing gasket of compressible material is affixed to the closure means for compression thereby against the container opening. It is a feature of the invention that the closure means, although they may be affixed to one of the drive members, need not rotate with respect to the container engaged thereby as the closure is actuated; the major frictional reaction which would otherwise be incurred is thus eliminated.

The basic principles of linear motion strain wave drive are disclosed in United States Patent No. 2,943,508 to C. W. Musser, issued July 5, 1960, and entitled "Strain Wave Drive-Linear Motion," pertaining to what may be referred to generally as cylindrical forms of such drives; and in my co-pending application filed March 26, 1962, Serial No. 182,586, and entitled "Improved Strain Wave Drive," which pertains to non-cylindrical forms of such drives. A linear motion strain wave drive generally comprises a relatively rigid circumferentially-grooved or helically-threaded member such as a screw; an annular deformable member arranged coaxially with the rigid member, and having a circumferential working surface portion of a diameter which differs when undeflected from the effective diameter of the grooves; and a strain wave generator member which deflects the working surface portion of the deformable member into engagement with the grooves at circumferentially-spaced positions interspaced by non-engaging positions. By rotating the strain wave generator, the deflection pattern is propagated rotationally about the deformable member to produce a relative linear movement of the deformable and the grooved members along the polar axis of the members, even though they may be restrained against relative rotation. This movement involves a reaction component of rolling friction in the circumferential direction, and a minor reaction component of sliding friction in the radial direction, the latter being caused by the small relative motion of cyclical radial engagement and disengagement between the active surfaces of the two members. There is also a reaction of sliding circumferential friction between the strain wave generator and the deformable member, but this may be minimized by forming or coating them with low-friction materials.

In the practice of the present invention, a closure element may integrally form a closure disc adapted to extend over the opening of the container, and a circumferential flange extending from the disc along the polar axis of the closure assembly to form one or the other of the deformable member and the strain wave generator member. In either case, the drive member not included in the closure element may comprise an annular element substantially coaxially spaced about the polar axis within or without the closure element. In the case that the strain wave generator is formed integrally in the closure element, the deformable member may comprise a ring seated within the circumference of the closure element to engage the grooves or threads of the container. On the other hand, where the deformable member is incorporated in the closure element, the strain wave generator may comprise a separate annulus externally spaced about the closure element. In still another form, the deformable member, the strain wave generator, and the closure disc may be formed as separate elements, the latter being drivingly engaged with one of the members for movement along the polar axis.

While the specification concludes with claims particularly pointing out the subject matter which I regard as my invention, it is believed that a clearer understanding may be gained from the following detailed description of preferred embodiments thereof, referring to the accompanying drawings, in which:

FIG. 1 is a sectional view in elevation of an embodiment of the improved closure incorporating a non-cylindrical form of linear motion strain wave drive, taken along line 1—1 in FIG. 2, looking in the direction of the arrows;

FIG. 2 is a sectional plan view taken along line 2—2 in FIG. 1, looking in the direction of the arrows;

FIG. 3 is a sectional elevation of an embodiment of the invention incorporating another non-cylindrical form of linear motion strain wave drive;

FIG. 4 is a fragmentary plan view of a strain wave generator member of the closure of FIG. 3;

FIG. 5 is a plan view of a modified form of strain wave generator member;

FIG. 6 is a view in elevation of the strain wave generator member of FIG. 5; and FIG. 7 is a fragmentary view in cross-sectional elevation of another embodiment of the improved closure.

Referring to FIGS. 1 and 2, an embodiment of the improved closure is shown in which a sealing gasket is required to turn relative to the container sealed thereby, and which therefore does not eliminate this source of friction, although it does provide other advantages of the invention. A closure cap or element 10 integrally incorporates a closure disc 12 and a circumferential flange 14 forming a strain wave generator for cooperation with a deformable ring member 16. The closure is shown attached to a neck portion 18 of a conventional container jar 20, which is formed with a lip 22 about a circular opening 24. The neck 18 is formed with four circumferentially-overlapping helical thread segments 26 extending about the neck 18 in a conventional manner.

For sealing engagement with the lip 22 of the container, a ring gasket 28 of resilient sealing material, such as rubber, is positioned about the lower surface of the disc 12. The flange 14 is formed with a radially-protruding recessed portion 30 about its lower end to receive and entrap the deformable ring 16, thus retaining the ring in operative relation to the strain wave generator flange 14 and preventing its loss when the closure is removed from the container.

The deformable ring 16 is formed as a semi-toroid, for achieving high radial flexibility with circumferential stiffness. It is formed of polyethylene or other resilient material, having sufficient stiffness to support the moments applied by the strain wave generator 14. The ring should preferably exhibit a low coefficient of friction about its outer circumference, which is in sliding engagement with the strain wave generator. To this end, the ring has a coating 32 of a material having a low coefficient of friction, such as tetrafluoroethylene polymer; but the entire ring may alternatively be formed of such material if it has sufficient stiffness. For deflecting the ring into engagement with the threads 26 at circumferentially-spaced locations, I form the recessed portion 30 with a plurality of circumferentially-spaced indentations 34, which are four in number in the embodiment shown.

As the closure is initially assembled upon the jar by rotation of the closure cap 10, the sliding friction arising between the threads 26 and the deformed ring 16 may initially be less than the sliding friction between the ring and the indentations 34; the ring will therefore turn with the closure cap, and the closure will not operate as a strain wave drive, but as a conventional screw top. The torque necesary to initiate the threading engagement is relatively minor. However, as the gasket ring 28 begins to engage the lip 22 of the container and to become deformed, the axial reaction against further rotation of the closure in sealing direction increases sharply, and would correspondingly raise the force required to overcome sliding friction between a conventional screw top and the threaded container. Since the gasket constitutes an energy storing system, essentially the same high level of torque would be necessary to subsequently remove the sealed top. In the improved construction shown, however, a condition will be reached in which the frictional engagement between the ring 16 and the threads 26 will exceed that between the ring and the closure cap 10; at this time, the closure cap will commence to rotate with respect to the ring 16, and the device will act as a linear motion strain wave drive thenceforward as it is tightened. Therefore, rolling rather than sliding friction arises between the ring and the threads, while the sliding friction between the closure cap and the ring, which involves a low coefficient of friction, adds only a small increment to the torsion required. During this phase of operation, the ring 16 may or may not rotate to some extent with respect to the threads 26; relative rotation is unnecessary for the establishment of linear motion parallel to the polar axis, which is indicated at 36 in FIG. 1.

Referring to FIG. 3, an embodiment is shown in which a deformable member and a closure disc member are integrally formed in a closure element or cap; in embodiments of this kind, the cap need not rotate with respect to the container, and therefore it is possible to eliminate the large amount of friction otherwise arising between the container and a sealing gasket secured within the cap. The closure is shown with a container 20' which is similar to the container 20 in FIG. 1, and has corresponding elements similarly numbered, with prime superscripts. In this instance, a closure cap 40 integrally incorporates a closure disc 42 and a circumferential flange 44 comprising a deformable member. The flange 44 is formed as a non-cylindrical annular body of revolution of a line segment about the polar axis 46 of the closure, in accordance with principles disclosed in my aforementioned copending application. The term "non-cylindrical" comprehends bodies of revolution whose surfaces are generated by line segments selected from a group which includes curved lines as well as straight lines inclined at an acute angle to the polar axis of revolution. Thus, the flange 44 might be substantially frusto-conical rather than being of curved section. Such forms are desirable in the deformable member, partially because the radial deflection of a circumferential working surface portion is not transmitted through the entire body to a closed axial end thereof, such as is formed by the disc 42 of the closure cap 40, and it is therefore feasible to incorporate the disc and the deformable member into an integral element.

The flange 44 is provided with a circumferential working surface portion 48 comprising a reverse bend in the line segment from which the body of revolution is generated, for conforming engagement with the roots of the threads 26'. The closure cap terminates in an open end 50 for receiving the neck 18' of the container. A gasket ring 52 of resilient material is received upon the lower surface of the disc 42 for sealing engagement with the circular lip 22'.

In this embodiment, the rigid member comprises a generally cylindrical ring 54 spaced about the closure cap 40, and assembled therewith by axial movement prior to attachment of the closure to the container. The ring 54 is circumferentially rolled about the upper and lower edges 56 and 58, respectively, to stiffen the body radially, as well as to protect the fingers of the user. About its lower edge 58, the ring is further provided with a radial flange 60 extending circumferentially thereabout, and forming a working surface portion of the strain wave generator for cooperation with the working surface portion 48 of the closure element. For this purpose, the flange 60 has a circumferentially-spaced group of lobes 62 projecting radially inwardly to deflect the portion 48 into engagement with circumferentially-spaced portions of the threads 26'. As best shown in FIG. 4, the remaining inner circumference 64 of the flange 60 is radially offset to clear the working surface portion 48 and thus permit outward deflection thereof beyond the tips of the teeth 26'.

It will be understood that rotation of the ring 54 will cause the closure cap 40 to be actuated along the polar axis 46, but does not require rotation of the cap and the gasket relative to the container; frictional torque between these members is therefore eliminated. The operation is otherwise similar to that previously described in connection with the embodiments of FIGS. 1 and 2. It should be noted that the characteristic of the non-cylindrical deformable member that the radial reflection of the working surface portion is not transmitted to the closed end of the closure cap, makes it possible to integrally unite the deformable member 44 with the closure disc 42; this arrangement is feasible where a cylindrical form of strain wave drive is incorporated, only if sufficient axial length is provided to attenuate the strain wave to reduce the radial component to zero, or if this result be otherwise achieved by providing sufficient flexibility.

The strain wave generator may take a multiplicity of forms, and an alternative embodiment is shown in FIGS. 5 and 6. The generator is here formed simply as a circular ring 66 of a circular cross-section, in which are formed circumferentially-spaced flattened lobe portions 68, by forging, stamping, or in any other suitable fashion. This type of strain wave generator may, for example, be substituted for the ring 54 in the embodiment of FIG. 3.

The closure disc or member may alternatively be formed separately from the members of the strain wave drive mechanism, and be drivingly engaged with one of them in relatively rotatable relationship, for axial movement with respect to the container. This arrangement also eliminates sliding friction between the container and a sealing gasket attached to the closure member. Such an embodiment is shown in FIG. 7, in conjunction with a container 20'', whose elements are numbered similarly to those of the foregoing figures, with double-prime superscripts. A closure cap 70 is formed with a closure disc portion 72, and with a circumferential flange 74, and has an attached gasket ring 76 for sealing the lip 22'' of the container.

A ring 78 is received circumferentially about the cap 70 for manual operation of the closure, and is formed with a circumferential flange 80 overlying the disc 72 to drive the latter into sealing engagement with the container. About its lower edge, the ring 78 is provided with a circumferential flange 82 forming a working surface portion, which has radial lobe protrusions 84 spaced apart thereabout, similar to the lobes 62 in the embodiment of FIGS. 3 and 4, so that the ring comprises a strain wave generator. The lobes 84 cooperate with a deformable ring member 86 similar to the ring 16 in the embodiment of FIGS. 1 and 2, which has a coating of low-friction material 88 about its outer circumference.

The operation of the closure is generally similar to that of the preceding embodiment, except that the closure cap 70 is in this instance rotationally free of the strain wave drive members; again, avoidance of rotation between the gasket ring 76 and the lip 22'' eliminates this source of friction. As the closure is removed, interference takes place between the flange 74 and circumferential portions of the ring 86 spaced between the lobes, which are flexed outwardly beneath the flange 74 (not shown in FIG. 7). This interference positively lifts the cap 70 to break the seal between the gasket ring and the container. It should be noted that since the ring 84 is not forced to rotate with respect to the cap 70, no additional source of frictional reaction torque is introduced by this seal-breaking action.

Whether the closure disc member be formed integrally with the deformable drive member or be a separate part, it should be understood that there need be no relative rotation between the disc or an attached gasket ring and the lip of the container, since there need be no rotation of the deformable member with respect to the container. These forms are therefore most advantageous, in that the torsion required to overcome rotational friction between the sealing gasket and the container lip is eliminated. However, an embodiment as in FIGS. 1 and 2, in which the closure disc is formed integrally with the strain wave generator, affords many other advantages of the invention previously set forth.

While I have shown and described specific embodiments of my invention by way of illustration, it will be apparent that various changes and modifications may readily be made without departing from the true spirit and scope of the invention. For example, the deformable member may be formed as a cylindrical annulus having helical or axially-spaced circular wall convolutions, and a closure disc may then be received in one of the convolutions while another acts as a working surface portion; the disc would be gripped by the deformable member only at circumferentially-spaced portions corresponding to the portions of the working surface-forming convolution engaged by the strain wave generator lobes. Further, the deformable member may be slotted axially or circumferentially if increased flexibility is required.

What I claim is:

1. A sealing closure for an opening in a container having a grooved circumferential portion extending about the opening, said sealing closure comprising, in combination:

a deformable member comprising an annular body of revolution about a polar axis, said deformable member having at least one axial end thereof arranged to receive the grooved portion of the container and having a circumferential working surface portion of a different diameter when undeflected from the effective diameter of said grooved portion, said working surface portion extending circumferentially about said grooved portion in an assembled relation of said closure with said container;

a strain wave generator member engaging said deformable member to deflect said working surface portion into engagement with said grooved portion at a plurality of circumferentially-spaced positions interspaced by non-engaging positions, said generator member being rotatable about said polar axis with respect to said deformable member for propagating a rotating strain wave to produce linear motion of said deformable member along said polar axis with respect to said grooved portion;

and closure cap means drivingly engaged with one of said members for movement thereby along said polar axis to sealingly engage the opening in said container.

2. A sealing closure as recited in claim 1, in which said one of said members drivingly engaged with said closure means comprises said strain wave generator member, and is formed as an annulus extending axially from said working surface portion to said closure means.

3. A sealing closure as recited in claim 1, in which said one of said members drivingly engaged with said closure means comprises said deformable member, and is formed as an annulus extending axially from said working surface portion to said closure means.

4. A sealing closure as recited in claim 1, in which said strain wave generator member comprises an annulus circumferentially spaced about said working surface portion and formed with circumferentially-spaced lobe portions projecting radially inwardly into deflecting engagement with said working surface portion.

5. A sealing closure as recited in claim 4, in which said strain wave generator comprises a toroid having axially-flattened lobe portions circumferentially spaced thereabout.

6. A sealing closure as recited in claim 1, said closure means including a gasket for sealingly engaging said container about said opening therein, said closure means further being free to rotate with respect to said strain wave generator member, said gasket being compressible against said container by actuation of said closure while restrained against rotation with respect to said container by frictional engagement therewith.

7. A sealing closure for an opening in a container having a grooved circumferential portion extending about the opening, said sealing closure comprising, in combination:
  a deformable member comprising an annular body of revolution about a polar axis, said deformable member having at least one axial end thereof arranged to receive the grooved portion of the container and having a circumferential working surface portion of a different diameter when undeflected from the effective diameter of said grooved portion, said working surface portion extending circumferentially about said grooved portion in an assembled relation of said closure with said container;
  a strain wave generator member engaging said deformable member to deflect said working surface portion into engagement with said prooved portion at a plurality of circumferentially-spaced positions interspaced by non-engaging positions, said generator member being rotatable about said polar axis with respect to said deformable member for propagating a rotating strain wave to produce linear motion of said deformable member along said polar axis with respect to said grooved portion;
  one of said members being integrally formed in a closure element having closure cap-forming means overlying said opening of said container in an assembled relation of said closure therewith, for movement with said one of said members along said polar axis to sealingly engage said container.

8. A sealing closure for an opening in a container having a grooved circumferential portion extending about the opening, said sealing closure comprising in combination:
  a deformable member comprising an annular body of revolution about a polar axis, said deformable member having at least one axial end thereof arranged to receive the grooved portion of the wall and having a circumferential workng surface portion of a greater diameter when undeflected than the effective diameter of said grooved portion, said working surface portion extending circumferentially about said grooved portion in an assembled relation of said closure with said container;
  a strain wave generator member engaging said deformable member to deflect said working surface portion into engagement with said grooved portion at a plurality of circumferentially-spaced positions interspaced by non-engaging positions, said generator member being rotatable about said polar axis with respect to said deformable member for propagating a rotating strain wave to produce linear motion of said deformable member along said polar axis with respect to said grooved portion;
  and closure cap means for overlying the opening of said container in an assembled relation of said closure with said container, one of said members being formed with a portion overlying said cap for compression thereof against said container to seal said opening upon actuation of said closure in one direction.

References Cited in the file of this patent
UNITED STATES PATENTS

| | | |
|---|---|---|
| 1,954,491 | Rollason | Apr. 10, 1934 |
| 2,701,659 | Baltosser | Feb. 8, 1955 |
| 2,785,824 | Reeves | Mar. 19, 1957 |
| 2,943,508 | Musser | July 5, 1960 |

FOREIGN PATENTS

| | | |
|---|---|---|
| 18,821/34 | Australia | July 9, 1935 |
| 693,074 | Great Britain | June 24, 1953 |
| 1,095,825 | France | Dec. 29, 1954 |